July 5, 1927.
A. H. EDDY
1,634,936
MEANS FOR SECURING NAME PLATES AND THE LIKE
Filed May 27, 1925
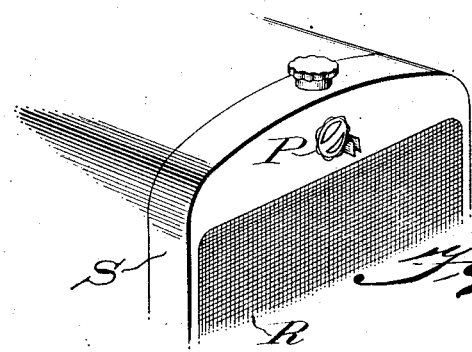
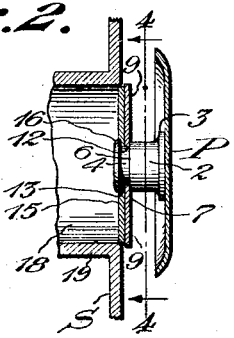
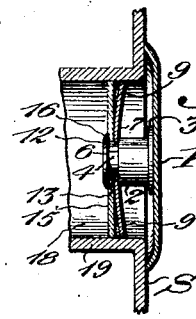
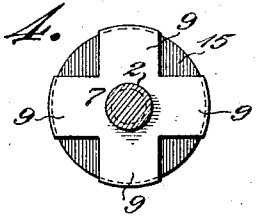
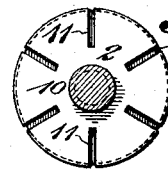
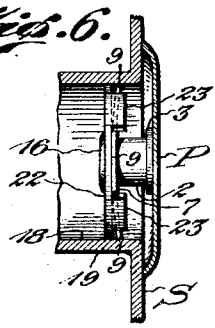
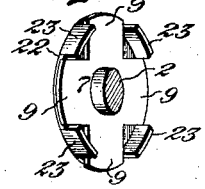
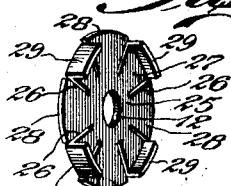
Inventor
Albert H. Eddy
By
Attorneys Patented July 5, 1927.

1,634,936

UNITED STATES PATENT OFFICE.

ALBERT HENRY EDDY, OF PAWTUCKET, RHODE ISLAND, ASSIGNOR TO A. L. NEWMAN COMPANY, OF CRANSTON, RHODE ISLAND, A CORPORATION OF RHODE ISLAND.

MEANS FOR SECURING NAME PLATES AND THE LIKE.

Application filed May 27, 1925. Serial No. 33,224.

This invention relates to improvements in means for securing name-plates, emblems, medallions, or like devices to other objects, and particularly to means for securing the manufacturer's name-plate or insignia to the front of the radiator shell of a motor vehicle.

One object of the improvement is to provide means whereby the name-plate or other device may be fastened securely in position on the front of the radiator shell or other structure by simply pressing it thereagainst to introduce its frictional gripping means into a depression or orifice in the shell or other structure.

Another object of the invention is to provide a holding or gripping means for the name-plate or other article which will lock it securely in position against the radiator shell or other structure to prevent its release therefrom under shock or jar, and also to hold it from being pried off from the structure to which it is secured.

Another object of the improvement is to provide securing means for the name-plate or other article which may be more readily and conveniently applied to position without the use of tools or the exercise of particular skill or expertness.

Another object of the improvement is to provide a securing device for the name-plate or other article having means for guiding the gripping or locking element into position while holding it from canting or twisting in the socket or orifice in which it is received.

Another object of the improvement is to provide a reinforcing and stiffening element for the resilient gripping means on the name-plate or other article which will prevent said means from becoming flexed or deformed to allow the plate or other article to be pried off from the structure to which it is attached.

Another object of the improvement is to provide a securing or locking device for the name-plate or other article which is more economical to manufacture and generally more durable and efficient in use.

Further objects of the improvement are set forth in the following specification, which describes several preferred embodiments of the invention as illustrated in the accompanying drawings. In the drawings:

Fig. 1 is a perspective view showing the radiator shell of a motor vehicle with a conventional form of name-plate or emblem applied to its front;

Fig. 2 is a vertical sectional view taken through the center of the radiator shell and illustrating the improved securing means on the name-plate or emblem as being entered into the orifice in the shell;

Fig. 3 is a similar sectional view showing the name-plate pressed against the front of the radiator shell with the improved securing means forced into the orifice to lock the plate in place;

Fig. 4 is a transverse sectional view of the locking or securing device taken on the line 4—4 of Fig. 2 and illustrating the resilient gripping element and its guiding disk in face view;

Fig. 5 is a similar view illustrating a modified form of the locking or gripping plate;

Fig. 6 is a sectional view similar to Fig. 3 showing a modified form of the guiding and reinforcing disk for the securing means;

Fig. 7 is a perspective view of this modified form of the locking device and its reinforcing plate; and Fig. 8 illustrates a still further modification of the device in which the locking element and its guiding means are combined in a single element.

The present invention consists in general in providing the name-plate or other object to be secured to the radiator shell or other structure with a resilient deformable plate or element attached in spaced relation to its rearward side and adapted to be inserted in a depression or orifice at the front of the radiator shell; the deformable element being normally of slightly greater diameter than that of the orifice whereby when it is forced thereinto it will be flexed and convexed in cross-section to cause its edges to securely grip the walls of the orifice to lock the plate to the radiator shell or other structure. A further feature of the present improvement consists in providing a guiding element or disk arranged concentric with the locking member and having its diameter substantially equal to that of the orifice in the radiator shell or other structure, whereby it serves to guide the locking member into place to center it in position and to hold it from canting, twisting or buckling.

In Fig. 1 of the drawings S designates the shell or shield which encloses the cellular radiator-structure R, employed with most types of motor vehicles, and on the front of which is generally placed a name-plate, emblem, or other metal insignia-bearing device P. It has become the preferred practice to attach the name-plate or emblem to the front of the radiator shell by means which may be pressed into place to grip the walls of a cavity or orifice in the shell-structure so as to avoid soldering, riveting, or other mechanical fastening means which require separate operations before or after assembling the shell with the radiator. For this purpose various types of concavo-convex, coniform and other irregularly-shaped resilient plates and rings have been employed, but heretofore such devices have not been entirely satisfactory for effecting a secure and permanent bond or union between the attached plate and the radiator shell or other structure. In the present improvement a relatively flat plate or disk-like element is employed as the gripping or securing means which is not previously shaped or distorted to adapt it to be inserted into the opening or orifice on the front of the radiator shell or other structure. The present improved securing means is therefore much simpler in construction, more economical to manufacture, and less liable to be weakened in the process of construction or when applied to position to attach the name-plate or other device to the front of the radiator shell.

Referring now to Fig. 2 of the drawings, P designates the name-plate, medallion, or other emblem, which may be made of relatively thin sheet-metal embossed on the front with letters or other insignia, and usually being of a generally concavo-convex shape in cross-section to adapt its edges to fit close against the front face of the radiator shell S. Soldered, brazed, or otherwise secured to the rearward face of the name-plate P is a central stud or abutment 2 which may be constructed in the form of a tubular or solid rivet. The rivet or stud 2 preferably has a flaring head or flange 3 providing an extended surface which may be soldered or brazed to the back of the plate P, and at its opposite end it is reduced in diameter at 4 for insertion through the locking plate or member 7 which fits against the shoulder 6 on the stud. The locking member or plate 7 is preferably constructed in the form of a flat sheet-metal disk having the required strength and resiliency, and in accordance with one embodiment, as illustrated in Fig. 4 of the drawings, portions of the disk or plate are cut away to shape it to the contour of a cross having radial arms 9. In other instances the locking element or plate may be constructed in the form of a disk 10 having radial slits 11 reaching in from its perimeter to provide a greater number of arms and a substantially continuous circular rim or periphery. In either of the forms as shown in Figs. 4 and 5 the locking member or plate 7 or 10, as the case may be, is provided with an axial hole 12 adapted to receive the reduced end 4 of the stud or rivet 2 which projects from the rearward face of the name-plate P. Abutting the rearward face of the locking member 7 or 10 is a guiding disk and reinforcing element 15 which is also punched with an axial hole 13 to adapt it to be slipped on to the reduced end 4 of the rivet 2. After the parts are assembled in place on the name-plate in this manner, as shown in Fig. 2, the end of the reduced portion 4 of the stud or rivet 2 is headed over at 16 to hold the securing member and its guiding disk rigidly in place against the shoulder 6 on the stud.

As shown in Fig. 2, the radiator shell S is usually constructed of sheet-metal, and for the purpose of attaching the name-plate or other insignia-bearing device thereto its front wall is provided with a cavity or orifice 18 which may be of circular or other contour. Usually the opening or orifice 18 is formed by flanging the metal of the shell inwardly to provide cylindrical walls 19. It has been mentioned that the guiding disk or reinforcing member 15 is of substantially the same diameter as that of the interior of the opening or orifice 18 in the radiator shell, and preferably the disk 15 fits the opening snugly, but without any tendency to bind therein. On the other hand, the gripping or locking plate 7 or 10 is made of greater diameter at its rim, so that it cannot be forced into the opening or orifice 18 without deforming the shape of the plate.

Fig. 2 of the drawings illustrates the securing means being entered into the orifice 18 in the radiator shell S, and it will be seen that the disk 15 acts as a guide to center and aline the gripping or locking element 7 with respect to the orifice. Therefore, when the guiding disk 15 is introduced into the orifice 18 and the name-plate P pressed firmly against the shell S the locking member 7 will be forced into the orifice by causing it to be bowed or concaved on its forward side to reduce it in diameter. In other words, the arms 9 of the plate 7, or the segments of the plate 10, are caused to be bent or bowed to deform the cross-sectional area of the plate into concavo-convex shape as shown in Fig. 3. It will be understood, of course, that the deforming of the locking element 7 or 10 requires considerable pressure in forcing the securing means into the orifice or aperture 18, and the inherent resiliency of the plate causes it to take a firm grip on the interior of the walls 19 of the orifice. That is to say, the edges of the locking member are caused to frictionally grip or bite against the walls of the orifice, whereby to hold the name-plate or other article securely against the front of the structure to which it is attached; and also, due to the convexing of the locking member, any force tending to pull the name-plate away from the radiator shell or other structure will only serve to more firmly lock it thereto.

It has been explained that the reinforcing and guiding disk 15 acts as a guide or pilot to aline the securing means in concentric relation with the opening or orifice 18 while holding it from canting or tilting therein, and it also serves the further function of stiffening or bracing the locking plate or member 7. Being placed at the back of the plate or member 7 it will effectually prevent the lattter from being flexed or concaved in the opposite direction from that shown in Fig. 3, or, in other words, it will prevent the locking member from buckling to cause release of the frictional grip which it takes on the walls of the aperture or orifice 18.

Figs. 6 and 7 illustrate a modification of the locking means shown in Figs. 2, 3 and 4, in which the guiding and reinforcing plate is constructed in a somewhat different manner to provide a more extended bearing thereof on the interior walls of the orifice 18. Referring particularly to Fig. 7, the disk 22 is provided with bent-over ears or segments 23 which have an outside diameter conforming to the interior diameter of the opening or aperture 18 in the radiator shell S. These ears or segments 23 may be formed integral with the disk when the latter is punched out of sheet-metal, and after being bent over in suitable dies they assume a position between the arms 9 of the locking member 7, as shown most clearly in Fig. 7.

Fig. 8 illustrates a still further modification in the structure of the locking means in which the guiding and gripping elements are combined in a single disk. In this embodiment of the invention the locking member is constructed in the form of a flat sheet-metal disk 25 which is provided with radial slits or saw-cuts 26 dividing it into eight segments or arms 27 and 28. Four of the arms or segments 27 are made longer than the alternating arms 28 and are bent over to form arcuate ears or segments 29 having an outside diameter corresponding to the inner diameter of the aperture 18 in the radiator shell. The arcuate sections 29 serve as the guiding means for centering the locking device in the aperture 18; and the arms 28 are constructed with their peripheral rims of greater diameter than that of the orifice, so that these arms will be bowed or deformed to exert a gripping action on the inner walls of the orifice, in the manner as previously explained in connection with the arrangement of the device shown in Figs. 2 and 3. This form of locking member with its integral guiding arms may be made of a single stamping and is practically as efficient as the arrangement first described.

It will be observed that my improvement provides a particular efficient device for the purpose specified, which has the advantages of being simpler and more economical to manufacture, less liable to breakage or damage, and at the same time having an increased gripping action and an easier method of application to use. As compared with other devices of the same type the present securing or locking plate may be constructed of heavier and stronger stock, since it does not require to be cupped, crimped or otherwise deformed in shape in the process of construction, so that in use it operates with a stronger and more efficient gripping action which renders it proof against detachment or removal from the radiator shell or other structure.

Various modifications other than those herein illustrated may be made in the form and structure of the device without departing from the spirit or scope of the invention. Therefore, without limiting myself to the exact construction herein shown and described, I claim:

1. Means for securing a name-plate, emblem or other article to a radiator shell or other structure having a circular orifice, comprising a disk-like element attached to the plate in spaced relation thereto and formed with at least four radial arms, the diameter of the disk-element being greater than that of the orifice to adapt said element to be forced into the orifice to distort the arms into arcuate shape to cause their edges to grip the walls of the orifice, and a disk-like member connected to the plate in concentric relation with the gripping element and having substantially the same diameter as that of the orifice whereby it serves to guide the gripping element into the orifice and to hold it from canting or twisting with respect thereto.

2. Means connected to a name-plate, emblem or other article to attach it to a radiator shell or other structure having an orifice, comprising a relatively flat disk-element cut away to form a plurality of radial arms and having a diameter greater than that of the orifice to adapt it to be forced thereinto to distort the element into substantially concavo-convex form whereby its edges will grip the walls of the orifice, and a guiding element comprising a relatively flat disk abutting the face of the gripping element and having a diameter substantially the same as that of the orifice whereby its circumferential edge acts to guide the gripping element into the orifice and to hold it from canting or buckling rearwardly therein.

3. Means for securing a name-plate or other article to a radiator shell or other structure having an orifice, comprising a guiding disk on said plate adapted to slide freely into the orifice, and a locking member on the plate arranged adjacent the guiding disk and adapted to follow the latter into the orifice and to frictionally engage the interior walls thereof.

4. A device for securing a name-plate or other object to a radiator shell or other structure having an orifice, comprising a guiding disk on the plate adapted to slide freely into the orifice, and locking means on the plate arranged adjacent the guiding disk and adapted to follow the latter into the orifice and to frictionally engage the walls thereof.

5. A device for securing a name-plate or other object to a radiator shell or other structure having an orifice, comprising circular guiding means on the plate adapted to slide freely into the orifice, and locking means on the plate arranged adjacent the guiding means and provided with at least three radial arms having arcuate edges of greater radius than the guiding means and adapted to follow the latter into the orifice to frictionally engage the walls thereof.

In testimony whereof I affix my signature.

ALBERT HENRY EDDY.

CERTIFICATE OF CORRECTION.

Patent No. 1,634,936.                                                  Granted July 5, 1927, to

ALBERT HENRY EDDY.

It is hereby certified that error appears in the above numbered patent requiring correction as follows: In the grant and in the heading to the printed specification the residence of the patentee is erroneously written and printed as "Pawtucket, Rhode Island", whereas said residence should have been written and printed as "Pawtuxet, Rhode Island"; and that the said Letters Patent should be read with this correction therein that the same may conform to the record of the case in the Patent Office.

Signed and sealed this 6th day of September, A. D. 1927.

M. J. Moore,

Seal.                                                       Acting Commissioner of Patents.